US009668257B2

(12) United States Patent
Lin et al.

(10) Patent No.: US 9,668,257 B2
(45) Date of Patent: May 30, 2017

(54) METHOD AND DEVICE FOR IMPLEMENTING MULTI-CELL SERVICE ON BASE STATION DEVICE

(71) Applicant: Huawei Technologies Co., Ltd., Shenzhen (CN)

(72) Inventors: Bo Lin, Beijing (CN); Yan Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/448,449

(22) Filed: Jul. 31, 2014

(65) Prior Publication Data
US 2014/0349635 A1 Nov. 27, 2014

Related U.S. Application Data

(63) Continuation of application No. PCT/CN2013/071167, filed on Jan. 31, 2013.

(30) Foreign Application Priority Data

Feb. 1, 2012 (CN) .......................... 2012 1 0022356

(51) Int. Cl.
*H04M 3/00* (2006.01)
*H04W 72/04* (2009.01)
(Continued)

(52) U.S. Cl.
CPC ....... *H04W 72/0433* (2013.01); *H04W 24/02* (2013.01); *H04W 36/0061* (2013.01); *H04W 88/08* (2013.01); *H04W 92/10* (2013.01)

(58) Field of Classification Search
CPC . H04W 28/04; H04W 28/06; H04W 36/0011; H04W 36/10; H04W 36/08;
(Continued)

(56) References Cited

U.S. PATENT DOCUMENTS 5,664,004 A 9/1997 Durchman et al.
7,633,926 B1 * 12/2009 Sethi ..................... H04L 12/189
370/312
(Continued)

FOREIGN PATENT DOCUMENTS

CN 1411646 A 4/2003
CN 101505500 A 8/2009
(Continued)

OTHER PUBLICATIONS

Nokia Siemens Network et al., "Addressing Within E-UTRAN," 3GPP TSG-RAN WG3 Meeting #60, R3-081467, May 5-9, 2008, 13 pages.
(Continued)

*Primary Examiner* — Kathy Wang-Hurst
*Assistant Examiner* — B. M. M Hannan
(74) *Attorney, Agent, or Firm* — Slater Matsil, LLP

(57) ABSTRACT

The present invention discloses a method and a device for implementing multi-cell service on a base station device, and relates to the communications field. The base station device includes at least two base station function entities, a base station function entity provides service to one or more cells and the base station function entity corresponds to a global identifier. The method further includes creating, by the base station device, a communication interface with a network node by using the global identifier. Data from the network node is received at the base station device by using the communication interface. The data is sent by the network node according to the global identifier of the base station function entity. The data is forwarded to the base station function entity corresponding to the global identifier of the base station function entity.

15 Claims, 12 Drawing Sheets

(51) Int. Cl.
*H04W 24/02* (2009.01)
*H04W 88/08* (2009.01)
*H04W 92/10* (2009.01)
*H04W 36/00* (2009.01)

(58) Field of Classification Search
CPC ... H04W 72/02; H04W 84/045; H04W 88/08; H04W 88/10; H04W 92/02; H04W 92/14; H04W 84/10; H04W 88/16; H04W 24/02; H04W 72/0433; H04W 92/10; H04W 28/08; H04L 29/12
USPC .............. 455/418, 466, 500, 507, 509, 560; 370/338, 469
See application file for complete search history.

(56) References Cited

U.S. PATENT DOCUMENTS

| | | | | |
|---|---|---|---|---|
| 9,357,483 | B2* | 5/2016 | Gao | H04W 52/0206 |
| 2007/0254667 | A1* | 11/2007 | Jokinen | H04W 36/12 455/436 |
| 2008/0108365 | A1* | 5/2008 | Buddhikot | H04W 16/10 455/452.1 |
| 2008/0227458 | A1* | 9/2008 | Wu | H04W 36/0011 455/437 |
| 2010/0195635 | A1* | 8/2010 | Maeda | H04W 8/26 370/338 |
| 2010/0322148 | A1* | 12/2010 | Liu | H04B 7/15557 370/315 |
| 2011/0014921 | A1* | 1/2011 | Neil | H04W 48/08 455/444 |
| 2011/0153844 | A1* | 6/2011 | Bovo | H04L 41/12 709/228 |
| 2011/0201367 | A1 | 8/2011 | Aminaka et al. | |
| 2011/0243097 | A1* | 10/2011 | Lindqvist | H04W 24/02 370/331 |
| 2011/0263282 | A1* | 10/2011 | Rune | H04J 11/0093 455/507 |
| 2011/0274086 | A1* | 11/2011 | Xu | H04L 63/061 370/331 |
| 2012/0002659 | A1 | 1/2012 | Kawaguchi | |
| 2012/0263096 | A1* | 10/2012 | Masini | H04W 36/10 370/315 |
| 2012/0309395 | A1* | 12/2012 | Centonza | H04W 84/045 455/436 |
| 2013/0294403 | A1* | 11/2013 | Srinivasan | H04W 36/165 370/331 |
| 2014/0295840 | A1* | 10/2014 | Keskitalo | H04W 36/08 455/436 |

FOREIGN PATENT DOCUMENTS

| | | |
|---|---|---|
| CN | 101646180 | 2/2010 |
| CN | 101815319 | 8/2010 |
| CN | 101860931 A | 10/2010 |
| CN | 101931589 A | 12/2010 |
| CN | 102227930 A | 10/2011 |
| EP | 2209348 A1 | 7/2010 |
| WO | 0145333 A1 | 6/2001 |
| WO | 2010122712 A1 | 10/2010 |

OTHER PUBLICATIONS

3rd Generation Partnership Project; Technical Specification Group Services and System Aspects; 3GPP System Architecture Evolution (SAE); Security architecture (Release 11), 3GPP TS 33.401 V11.2.0, Dec. 2011, 124 pages.

3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.4.0, Dec. 2011, 296 pages.

3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.4.0, Dec. 2011, 255 pages.

Nokia Siemens Networks, Nokia, "Addressing Within E-UTRAN," 3GPP TSG-RAN WG3 Meeting #60, R3-081323, Kansas City, Missouri, May 5-9, 2008, 11 pages.

* cited by examiner

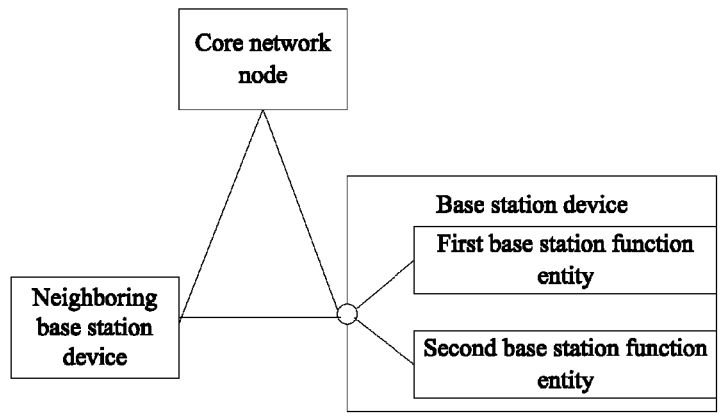

FIG. 3

```
┌─────────────────────────────────────────────────────────────────┐
│ A network node creates a communication interface with a base station │─301
│   device by using a global identifiers of a base station function entity │
│ included in the base station device, where the base station device includes │
│  at least two base station function entities, a base station function entity │
│   provides services of one or more cells and a base station function entity │
│                  corresponds to a global identifier                  │
└─────────────────────────────────────────────────────────────────┘
                                  ▼
┌─────────────────────────────────────────────────────────────────┐
│ When data needs to be sent to the base station function entity in the base │
│   station device, the network node determines a communication interface │
│    with the base station device according to a global identifier of the base │─302
│     station function entity when data needs to be sent to the base station │
│    function entity in the base station device, and sends the data to the base │
│   station device by using the communication interface with the base station │
│    device so that the data is forwarded by the base station device to the base │
│                           station function entity                           │
└─────────────────────────────────────────────────────────────────┘
```

FIG. 4

METHOD AND DEVICE FOR IMPLEMENTING MULTI-CELL SERVICE ON BASE STATION DEVICE

This application is a continuation of International Application No. PCT/CN2013/071167, filed on Jan. 31, 2013, which claims priority to Chinese Patent Application No. 201210022356.6, filed on Feb. 1, 2012, both of which are hereby incorporated by reference in their entireties.

TECHNICAL FIELD

The present invention relates to the communications field, and in particular, to a method and a device for implementing multi-cell service on a base station device.

BACKGROUND

With development of mobile broadband service, the bandwidth required by a user equipment increases greatly. At present, a base station may be set to provide service of multiple cells or a low-power access point may be introduced in a macro network scope to enhance system capacity to meet the requirements of the user equipment.

For example, in an LTE (Long Term Evolution) network, a base station identifier occupies 20 bits and a cell identifier occupies 28 bits, so that 1 to 256 cells can be set on a base station and that the base station can provide service of 1 to 256 cells. For another example, a low-power access point HeNB (Home eNB (evolved Node B, evolved NodeB), home base station) is introduced in a macro network, where an HeNB provides service of only one cell and the HeNB can enhance or expand macro network coverage, so as to enhance system capacity.

The prior art has at least the following problems:

A base station can provide service of at most 256 cells, and cannot provide service of more cells, and a HeNB provides only one cell. With continuous development of broadband service, the cell service provided by the base station and the HeNB will hardly meet user requirements.

SUMMARY

To enable a base station device to provide multi-cell service and meet user requirements, the present invention provides a method and a device for implementing multi-cell service on a base station device. The technical solutions are as follows.

A method for implementing multi-cell service on a base station device is provided. The base station device includes at least two base station function entities, a base station function entity provides service to one or more cells and the base station function entity corresponds to a global identifier. The method further includes creating, by the base station device, a communication interface with a network node by using the global identifier. Data from the network node is received at the base station device by using the communication interface. The data is sent by the network node according to the global identifier of the base station function entity. The data is forwarded to the base station function entity corresponding to the global identifier of the base station function entity.

A method for implementing multi-cell service on a base station device includes creating, by a network node, a communication interface with a base station device by using a global identifier of a base station function entity included in the base station device. The base station device includes at least two base station function entities, a base station function entity provides service of one or more cells and the base station function entity corresponds to a global identifier. When data needs to be sent to the base station function entity in the base station device, determining, by the network node, a communication interface with the base station device according to a global identifier of the base station function entity, and sending the data to the base station device by using the communication interface with the base station device so that the data is forwarded by the base station device to the base station function entity corresponding to the global identifier of the base station function entity.

A base station device is provided, where the base station device includes at least two base station function entities. A base station function entity provides service of one or more cells and the base station function entity corresponds to a global identifier. The base station device includes a first creating module configured to create a communication interface with a network node by using the global identifier. A first receiving module is configured to receive data from the network node by using the communication interface created by the first creating module. The data is sent by the network node according to a global identifier of the base station function entity. The data if forwarded to the base station function entity corresponding to the global identifier of the base station function entity.

A network node is provided where the network node includes a second creating module, configured to create a communication interface with a base station device by using a global identifier of a base station function entity included in the base station device. The base station device includes at least two base station function entities. A base station function entity provides service of one or more cells and the base station function entity corresponds to a global identifier. A second sending module is configured to, when data needs to be sent to the base station function entity in the base station device, determine, according to a global identifier of the base station function entity, the communication interface with the base station device that is created by the second creating module, and send the data to the base station device by using the communication interface with the base station device so that the data is forwarded by the base station device to the base station function entity.

A method for implementing multi-cell service on a base station device is provided. A home base station provides service of at least two cells, and a cell corresponds to a physical identifier and/or a piece of frequency information. The method includes receiving a handover request message. The handover request message carries a physical identifier and/or frequency information of a target cell, and the handover request message is used as a request for handing over a user equipment UE to the target cell. The method further includes determining the target cell according to the physical identifier and/or frequency information of the target cell, and deciding, according to resources of the target cell, whether to allow handover of the UE to the target cell.

A home base station is provided, where the home base station provides service of at least two cells, and a cell corresponds to a physical identifier and/or a piece of frequency information. The home base station includes a fourth receiving module configured to receive a handover request message. The handover request message carries a physical identifier and/or frequency information of a target cell, and the handover request message is used as a request for handing over an user equipment UE to the target cell. A determining module is configured to determine the target cell according to the physical identifier and/or frequency information of the target cell, and decide, according to resources of the target cell, whether to allow handover of the UE to the target cell.

A method for implementing multi-cell service on a base station device is provided. The base station device includes at least two base station function entities and a gateway entity. A base station function entity provides service of one or more cells and a base station function entity corresponds to a global identifier. The method includes creating, by the gateway entity, a first communication interface with the base station function entity, and creating a mapping relationship between a global identifier of the base station function entity and an identifier of the first communication interface. The method further includes creating, by the gateway entity, a second communication interface with a network node, sending the global identifier of the base station function entity in the base station device to the network node, and instructing the network node to create a mapping relationship between the global identifier of the base station function entity in the base station device and an identifier of the second communication interface. At the gateway entity, data from the network node is received by using the second communication interface, where the data is sent by the network node according to the mapping relationship between the global identifier of the base station function entity and the identifier of the second communication interface. At the gateway entity, the data is forwarded to the base station function entity corresponding to the data according to the mapping relationship between the global identifier of the base station function entity and the identifier of the first communication interface.

A base station device is provided, where the base station device includes at least two base station function entities and a gateway entity. A base station function entity provides service of one or more cells and the base station function entity corresponds to a global identifier. The gateway entity includes a third creating module configured to create a first communication interface with the base station function entity, and create a mapping relationship between a global identifier of the base station function entity and an identifier of the first communication interface. A fourth creating module is configured to create a second communication interface with a network node, send the global identifier of the base station function entity in the base station device to the network node, and instruct the network node to create a mapping relationship between the global identifier of the base station function entity in the base station device and an identifier of the second communication interface. A third receiving module is configured to receive data from the network node by using the second communication interface created by the fourth creating module, where the data is sent by the network node according to the mapping relationship between the global identifier of the base station function entity and the identifier of the second communication interface. A forwarding module is configured to forward the data to the base station function entity corresponding to the data according to the mapping relationship between the global identifier of the base station function entity and the identifier of the first communication interface created by the third creating module.

In the present invention, a base station device includes at least two base station function entities, and each base station function entity provides service of one or more cells, so that the base station device can provide multi-cell service. The base station device creates a communication interface with a network node by using a global identifier of a base station function entity in the base station device, and receives, by using the communication interface, data that is sent by the network node to the base station function entity, and forwards the data to the base station function entity. In this way, the base station device supports multi-cell service and meets user requirements.

BRIEF DESCRIPTION OF THE DRAWINGS

FIG. 3 is a schematic diagram of a network architecture according to Embodiment 2 of the present invention;

FIG. 4 is a flowchart of a method for implementing multi-cell service on a base station device according to Embodiment 3 of the present invention;

DETAILED DESCRIPTION OF ILLUSTRATIVE EMBODIMENTS

Figure 1:
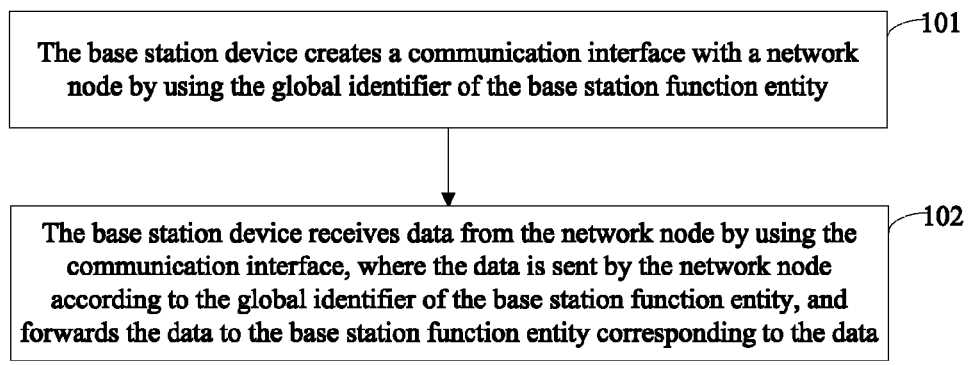
FIG. 1 is a flowchart of a method for implementing multi-cell service on a base station device according to Embodiment 1 of the present invention.

To make the objectives, technical solutions, and advantages of the present invention more comprehensible, the following further describes the embodiments of the present invention in detail with reference to the accompanying drawings.

Embodiment 1

The embodiment of the present invention provides a method for implementing multi-cell service on a base station device. The base station device includes at least two base station function entities, a base station function entity provides service of one or more cells and the base station function entity corresponds to a global identifier, and the method includes the following steps.

Step 101: The base station device creates a communication interface with a network node by using a global identifier of the base station function entity.

Step 102: The base station device receives data from the network node by using the communication interface. The data is sent by the network node according to the global identifier of the base station function entity, and then the base station device forwards the data to the base station function entity corresponding to the global identifier of the base station function entity.

The network node may be a core network node or a neighboring base station device, the communication interface may be an S1 interface or an X2 interface, and the global identifier of the base station function entity may occupy 28 bits.

In the embodiment of the present invention, a base station device incorporates multiple base station function entities, and each base station function entity provides service of one or more cells, so that the base station device can provide multi-cell service. The base station device creates a communication interface with a network node by using a global identifier of a base station function entity, and receives, by using the communication interface, data that is sent by the network node to the base station function entity, and forwards the data to the base station function entity. In this way, the base station device supports multi-cell service and meets user requirements.

Embodiment 2

The embodiment of the present invention provides a method for implementing multi-cell service on a base station device.

In this embodiment, the base station device incorporates at least two base station function entities, each base station function entity provides service of one or more cells, a base station function entity corresponds to a global identifier, and the global identifier can uniquely identify a base station function entity throughout a network.

The base station device incorporates at least two base station function entities, and each base station function entity can provide service of one or more cells. The base station device can create an S1 interface with a core network node, and send, by using the S1 interface, data to the core network node or receive data sent by the core network node; and, can create an X2 interface with a neighboring base station device, and send, by using the X2 interface, data to the neighboring base station device or receive data from the neighboring base station device. The core network node may be an MME (Mobility Management Entity) or a HeNB GW (GateWay,).

Figure 2:
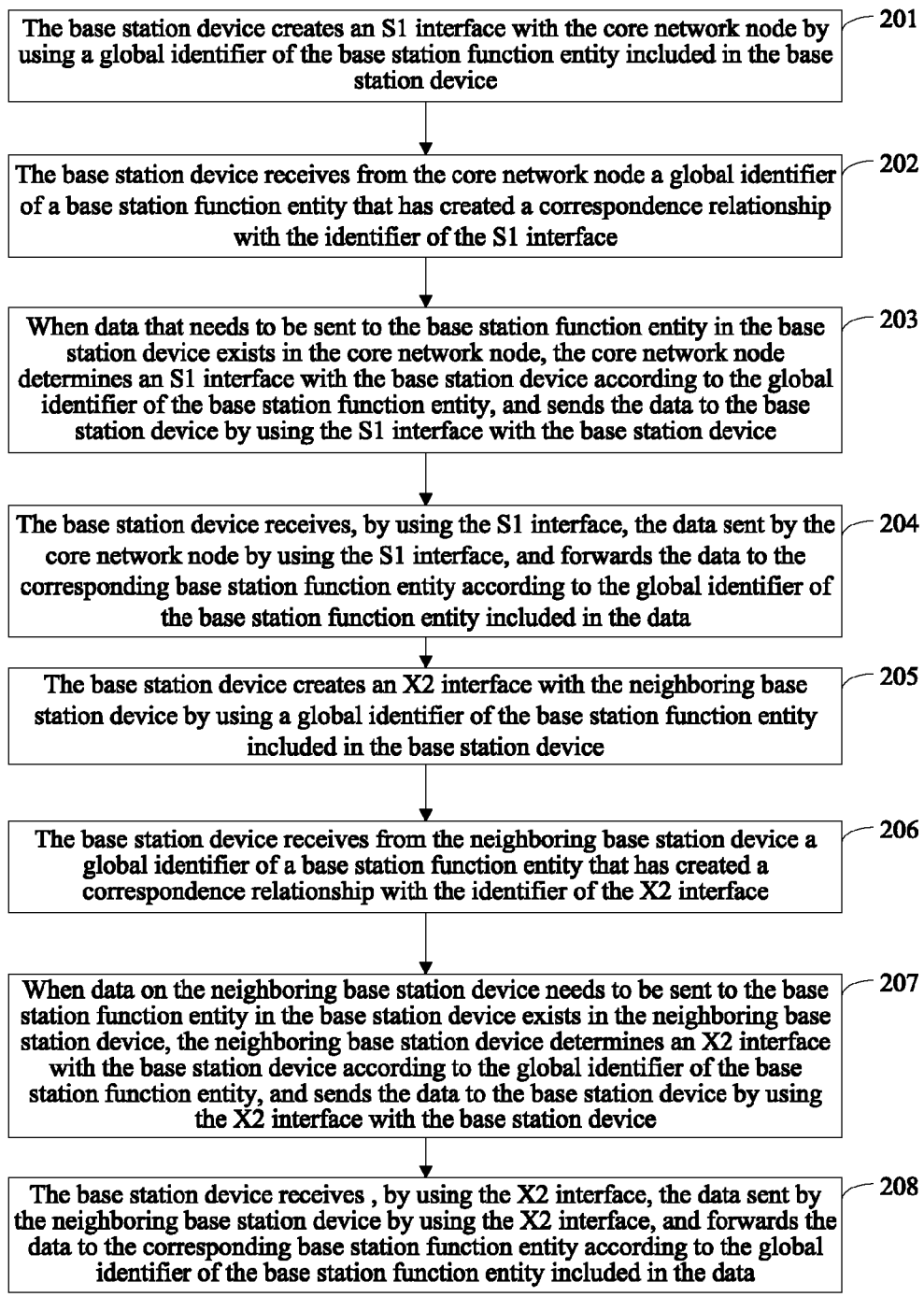
FIG. 2 is a flowchart of a method for implementing multi-cell service on a base station device according to Embodiment 2 of the present invention.

Referring to FIG. 2, in this embodiment, according to the following steps 201 to 204, the base station device can create an S1 interface with a core network node, and send, by using the S1 interface, data to the core network node or receive data sent by the core network node; and, according to the following steps 205 to 208, the base station device can create an X2 interface with a neighboring base station device, and send, by using the X2 interface, data to the neighboring base station device or receive data sent by the neighboring base station device, including:

Step 201: The base station device creates an S1 interface with the core network node by using a global identifier of the base station function entity included in the base station device.

Specifically, the base station device creates an S1 interface with the core network node, and instructs the core network node to create a mapping relationship between the global identifier of the base station function entity in the base station device and an identifier of the S1 interface.

This step may be implemented in the following manners:

Manner 1: Manner 1 may include the following steps (11) to (15):

(11) When a first base station function entity in the base station device needs to create an S1 interface with the core network node, the base station device sends an S1 interface creation message, where the S1 interface creation message carries a global identifier of the first base station function entity;

The first base station function entity is any base station function entity, which needs to create an S1 interface with the core network node, in the base station device.

The S1 interface creation message may be an S1 setup (S1 setup) message. For example, referring to FIG. 3, the base station device incorporates two base station function entities. When the first base station function entity needs to create an S1 interface with the core network node, the base station device sends an S1 interface creation message to the core network node, where the S1 interface creation message carries a global identifier ID1 of the first base station function entity.

(12) The core network node receives the S1 interface creation message, creates an S1 interface with the base station device, and creates a mapping relationship between the identifier of the S1 interface and the global identifier of the first base station function entity.

The core network node may use an IP (Internet Protocol, Internet Protocol) address and/or a port number of the base station device as an identifier of the S1 interface, or use an SCTP (Stream Control Transmission Protocol) association as an identifier of the S1 interface.

For example, the core network node receives an S1 interface creation message carrying the global identifier ID1 of the first base station function entity, and creates an S1 interface between the core network node and the base station device, where an identifier of the created S1 interface is IDA, and then stores a mapping relationship between the identifier IDA of the S1 interface and the global identifier ID1 of the first base station function entity as an entry of the mapping relationship between the identifier of the S1 interface and the global identifier of the base station function entity in Table 1.

TABLE 1

| Identifier of the S1 interface | Global identifier of a base station function entity |
|---|---|
| IDA | ID1 |
| ... | ... |

(13) The base station device sends a base station configuration update message to the core network node by using the S1 interface, where the base station configuration update message carries a first global identifier list, and the first global identifier list includes global identifiers of another base station function entity than the first base station function entity in the base station device.

For example, after creating the S1 interface with the core network node, the base station device sends a base station configuration update message by using the S1 interface, where the base station configuration update message carries a first global identifier list, and the first global identifier list includes global identifiers of another base station function entity than the first base station function entity in the base station device, that is, a global identifier ID2 of the second base station function entity.

(14) The core network node receives the base station configuration update message by using the S1 interface, and determines, according to the first global identifier list carried in the base station configuration update message, that the base station function entity in the base station device needs to share the S1 interface.

(15) The core network node selects a global identifier of a base station function entity from the first global identifier list, and creates a mapping relationship between the identifier of the S1 interface and the selected global identifier of the base station function entity.

The core network node may select global identifiers of one or more base station function entities from the first global identifier list according to available resources, and allow the first base station function entity and the selected base station function entity to share the created S1 interface.

Specifically, the core network node selects a global identifier of a base station function entity from the first global identifier list, searches for a record inclusive of the identifier of the S1 interface from the mapping relationship between the identifier of the S1 interface and the global identifier of the base station function entity according to the identifier of the S1 interface, and stores the selected global identifier of the base station function entity into the found record. In this way, a mapping relationship between the selected global identifier of the base station function entity and the identifier of the S1 interface is created.

For example, the core network node selects a global identifier ID2 of a second base station function entity from the first global identifier list, and searches, according to the identifier IDA of the S1 interface, for a record that includes the identifier IDA of the S1 interface from the mapping relationship between the identifier of the S1 interface and the global identifier of the base station function entity, that is, the record in the second row in Table 1, and stores the global identifier ID2 of the second base station function entity into the found record to obtain a mapping relationship between the identifier of the S1 interface and the global identifier of the base station function entity in Table 2. In this way, a mapping relationship between the identifier of the S1 interface and the global identifier of the second base station function entity is created.

TABLE 2

| Identifier of the S1 interface | Global identifier of a home base station function entity |
|---|---|
| IDA | ID1, ID2 |
| ... | ... |

Manner 2: Manner 2 may include the following steps (21) to (23):

(21) When the base station device needs to create an S1 interface with the core network node, the base station device sends an S1 interface creation message, where the S1 interface creation message carries a second global identifier list, and the second global identifier list includes the global identifier of the base station function entity included in the base station device.

(22) The core network node receives the S1 interface creation message, and creates an S1 interface with the base station device.

(23) The core network node selects a global identifier of a base station function entity from the second global identifier list carried in the S1 interface creation message, and creates a mapping relationship between the identifier of the S1 interface and the selected global identifier of the base station function entity.

Further, in this embodiment, the S1 interface creation message may include a first information element and a second information element. First, the base station device selects a base station function entity from all base station function entities included in the base station device; then sends an S1 interface creation message, where the first information element in the S1 interface creation message carries the global identifier of the selected base station function entity, and the second information element carries a third global identifier list, and the third global identifier list includes global identifiers of another base station function entity than the selected base station function entity in the base station device.

A default base station function entity is preset on the base station device, and the base station device may select the default base station function entity; or, a priority level of each base station function entity in the base station device is preset, and the base station device may select the base station function entity of the highest priority level.

Then the core network node receives the S1 interface creation message, creates an S1 interface with the base station device, and preferentially selects the global identifier of the base station function entity carried in the first information element. If one more global identifier of a base station function entity needs to be selected, the core network node selects a global identifier of a base station function entity from the third global identifier list, and creates a mapping relationship between the identifier of the S1 interface and the selected global identifier of the base station function entity.

Step 202: The base station device receives from the core network node a global identifier of a base station function entity that has created a mapping relationship with the identifier of the S1 interface.

If the base station device uses Manner 1 to create the S1 interface with the core network node, the core network node may send a base station configuration update response message to the base station device, where the base station configuration update response message carries the global identifier of the base station function entity that has created a mapping relationship with the identifier of the S1 interface; if the base station device uses Manner 2 to create the S1 interface with the core network node, the core network node may send an S1 interface creation response message to the base station device, where the S1 interface creation response message carries the global identifier of the base station function entity that has created a mapping relationship with the identifier of the S1 interface.

When a base station function entity in the base station device needs to send data to the core network node, the base station device determines whether the global identifier of the base station function entity exists in the global identifier of the base station function entity that has created the mapping relationship with the identifier of the S1 interface, and, if yes, send the data to the core network node by using the S1 interface, or, if not, discard the data.

Step 203: When data that needs to be sent to the base station function entity in the base station device exists in the core network node, the core network node determines an S1 interface with the base station device according to the global identifier of the base station function entity, and sends the data to the base station device by using the S1 interface with the base station device.

When data that needs to be sent to the base station function entity in the base station device exists in the core network node, the core network node searches for the identifier of the corresponding S1 interface from a stored mapping relationship between the identifier of the S1 interface and the global identifier of the base station function entity according to the global identifier of the base station function entity included in the data, where the S1 interface corresponding to the found identifier of the S1 interface is an S1 interface with the base station device. The core network node sends the data to the base station device by using the S1 interface with the base station device.

Step 204: The base station device receives, by using the S1 interface, the data sent by the core network node, and forwards the data to the corresponding base station function entity according to the global identifier of the base station function entity included in the data.

Specifically, the base station device receives, by using the S1 interface, the data sent by the core network node, extracts the global identifier of the base station function entity from the data, and forwards the data to the corresponding base station function entity according to the extracted global identifier of the base station function entity.

Step 205: The base station device creates an X2 interface with a neighboring base station device by using the global identifier of the base station function entity included in the base station device.

Specifically, the base station device creates an X2 interface with the neighboring base station device, and instructs the neighboring base station device to create a mapping relationship between the global identifier of the base station function entity in the base station device and an identifier of the X2 interface.

This step may be implemented in the following manners:

Manner 1: Manner 1 may include the following steps (11) to (15):

(11) When a first base station function entity in the base station device needs to create an X2 interface with the neighboring base station device, the base station device sends an X2 interface creation message, where the X2 interface creation message carries a global identifier of the first base station function entity.

The first base station function entity is a base station function entity, which is the first, in the base station device, that needs to create an X2 interface with the neighboring base station.

The X2 interface creation message may be an X2 setup (X2 setup) message. For example, referring to FIG. 3, the base station device incorporates two base station function entities. When the first base station function entity needs to create an X2 interface with the neighboring base station device, the base station device sends an X2 interface creation message to the neighboring base station device, where the X2 interface creation message carries a global identifier ID1 of the first base station function entity.

(12) The neighboring base station device receives the X2 interface creation message, creates an X2 interface with the base station device, and creates a mapping relationship between the identifier of the X2 interface and the global identifier of the first base station function entity.

An IP address and a port number of the base station device may be used as the identifier of the X2 interface; or, an SCTP association may be used as the identifier of the X2 interface.

For example, the neighboring base station device receives an X2 interface creation message carrying the global identifier ID1 of the first base station function entity, and creates an X2 interface between the neighboring base station device and the base station device, where an identifier of the created X2 interface is IDB, and then stores a mapping relationship between the identifier IDB of the X2 interface and the global identifier ID1 of the first base station function entity as an entry of the mapping relationship between the identifier of the X2 interface and the global identifier of the base station function entity in Table 3.

TABLE 3

| Identifier of the X2 interface | Global identifier of a base station function entity |
|---|---|
| IDB | ID1 |
| ... | ... |

(13) The base station device sends a base station configuration update message to the neighboring base station device by using the X2 interface, where the base station configuration update message carries a first global identifier list, and the first global identifier list includes global identifiers of another base station function entity than the first base station function entity in the base station device.

For example, after creating the X2 interface with the neighboring base station device, the base station device sends a base station configuration update message by using the X2 interface, where the base station configuration update message carries a first global identifier list, and the first global identifier list includes global identifiers of another base station function entity than the first base station function entity in the base station device, that is, a global identifier ID2 of the second base station function entity.

(14) The neighboring base station device receives the base station configuration update message by using the X2 interface, and determines, according to the first global identifier list carried in the base station configuration update message, that the base station function entity in the base station device needs to share the X2 interface.

(15) The base station device selects a global identifier of a base station function entity from the first global identifier list, and creates a mapping relationship between the identifier of the X2 interface and the selected global identifier of the base station function entity.

The neighboring base station device may select global identifiers of one or more base station function entities from the first global identifier list according to available resources, and allow the selected base station function entity and the first base station function entity to share the created X2 interface.

Specifically, the neighboring base station device selects a global identifier of a base station function entity from the first global identifier list, searches for a record inclusive of the identifier of the X2 interface from the mapping relationship between the identifier of the X2 interface and the global identifier of the base station function entity according to the identifier of the X2 interface, and stores the selected global identifier of the base station function entity into the found record. In this way, a mapping relationship between the identifier of the X2 interface and the selected global identifier of the base station function entity is created.

For example, the neighboring base station device selects a global identifier ID2 of a second base station function entity from the first global identifier list, and searches, according to the identifier IDB of the X2 interface, for a record inclusive of the identifier IDB of the X2 interface from the mapping relationship between the identifier of the X2 interface and the global identifier of the base station function entity in Table 3, that is, the record in the second row in Table 3, and stores the selected global identifier ID2 of the second base station function entity into the found record. In this way, a mapping relationship between the identifier of the X2 interface and the global identifier of the base station function entity in Table 4 is obtained.

TABLE 4

| Identifier of the X2 interface | Global identifier of a base station function entity |
|---|---|
| IDB | ID1, ID2 |
| ... | ... |

Manner 2: Manner 2 may include the following steps (21) to (25):

(21) When the base station device needs to create an X2 interface with the neighboring base station device, the base station device sends an X2 interface creation message, where the X2 interface creation message carries a second global identifier list, and the second global identifier list includes the global identifier of the base station function entity included in the base station device.

(22) The neighboring base station device receives the X2 interface creation message, and creates an X2 interface with the base station device.

(23) The neighboring base station device selects a global identifier of a base station function entity from the second global identifier list, and creates a mapping relationship between the identifier of the X2 interface and the selected global identifier of the base station function entity.

Further, in this embodiment, the X2 interface creation message may include a first information element and a second information element. First, the base station device selects a base station function entity from all base station function entities in the base station device; then sends an X2 interface creation message, where the first information element in the X2 interface creation message carries the global identifier of the selected base station function entity, and the second information element carries a third global identifier list, and the third global identifier list includes global identifiers of another base station function entity than the selected base station function entity in the base station device.

A default base station function entity is preset on the base station device, and the base station device may select the default base station function entity; or, a priority level of each base station function entity in the base station device is preset, and the base station device may select the base station function entity of the highest priority level.

Then the neighboring base station device receives the X2 interface creation message, creates an X2 interface with the base station device, and preferentially selects the global identifier of the base station function entity carried in the first information element. If one more global identifier of a base station function entity needs to be selected, the neighboring base station device selects a global identifier of a base station function entity from the third global identifier list carried in the second information element, and creates a mapping relationship between the identifier of the X2 interface and the selected global identifier of the base station function entity.

Step 206: The base station device receives from the neighboring base station device a global identifier of a base station function entity that has created a mapping relationship with the identifier of the X2 interface.

If the base station device uses Manner 1 to create the X2 interface with the neighboring base station device, the neighboring base station device may send a base station configuration update response message to the base station device, where the base station configuration update response message carries the global identifier of the base station function entity that has created a mapping relationship with the identifier of the X2 interface; if the base station device uses Manner 2 to create the X2 interface with the neighboring base station device, the neighboring base station device may send an X2 interface creation response message to the base station device, where the X2 interface creation response message carries the global identifier of the base station function entity that has created a mapping relationship with the identifier of the X2 interface.

When a base station function entity in the base station device needs to send data to the neighboring base station device, the base station device determines whether the global identifier of the base station function entity exists in the global identifier of the base station function entity that has created the mapping relationship with the identifier of the X2 interface, and, if yes, send the data to the neighboring base station device by using the X2 interface, or, if not, discard the data.

Step 207: When data that needs to be sent to the base station function entity in the base station device exists in the neighboring base station device, the neighboring base station device determines an X2 interface with the base station device according to the global identifier of the base station function entity, and sends the data to the base station device by using the X2 interface with the base station device.

When data that needs to be sent to the base station function entity in the base station device exists in the neighboring base station device, the neighboring base station device searches for the identifier of the corresponding X2 interface from a stored mapping relationship between the identifier of the X2 interface and the global identifier of the base station function entity according to the global identifier of the base station function entity included in the data, where the X2 interface corresponding to the found identifier of the X2 interface is an X2 interface with the base station device. The neighboring base station device sends the data to the base station device by using the X2 interface with the base station device.

Step 208: The base station device receives the data from the neighboring base station device by using the X2 interface, and forwards the data to the corresponding base station function entity according to the global identifier of the base station function entity included in the data.

Specifically, the base station device receives the data from the neighboring base station device by using the X2 interface, extracts the global identifier of the base station function entity from the data, and forwards the data to the corresponding base station function entity according to the extracted global identifier of the base station function entity.

In the embodiment of the present invention, a base station device incorporates at least two base station function entities, and each base station function entity provides service of one or more cells, so that the base station device can provide multi-cell service. The base station device creates an S1 interface with a core network node, and instructs the core network node to create a mapping relationship between a global identifier of the base station function entity in the base station device and an identifier of the S1 interface. When a base station function entity needs to send data to the core network node, the base station function entity determines whether the global identifier of the base station function entity exists in the global identifier of the base station function entity that has created the mapping relationship with the identifier of the S1 interface, and, if yes, send the data to the core network node by using the S1 interface, and receive, by using the S1 interface, data that is sent by the core network node to the base station function entity and forward the data to the base station function entity. The base station device creates an X2 interface with the neighboring base station device, and instructs the neighboring base station device to create a mapping relationship between the global identifier of the base station function entity in the base station device and an identifier of the X2 interface. When the base station function entity needs to send data to the neighboring base station device, the base station function entity determines whether the global identifier of the base station function entity exists in the global identifiers of the base station function entity that has created the mapping relationship with the identifier of the X2 interface, and, if yes, send the data to the neighboring base station device by using the X2 interface, and receive, by using the X2 interface, data that is sent by the neighboring base station device to the base station function entity and forward the data to the base station function entity. In this way, the base station device supports multi-cell service and meets user requirements.

In an embodiment, a mapping relationship between a global identifier of a base station function entity and an identifier of a network node may be created so that a base station device can communicate with the network node by using the interface. For detailed designs, reference may be made to the preceding embodiment.

In an embodiment, a mapping relationship between an identifier of an interface and an identifier of a network node may be created so that a base station device can communicate with the network node by using the interface. For detailed designs, reference may be made to the preceding embodiment.

Embodiment 3

As shown in FIG. 4, the embodiment of the present invention provides a method for implementing multi-cell service on a base station device, where the method including the following steps.

Step 301: A network node creates a communication interface with a base station device by using a global identifier of a base station function entity included in the base station device, where the base station device includes at least two base station function entities, a base station function entity provides service of one or more cells and the base station function entity corresponds to a global identifier.

Step 302: When data needs to be sent to the base station function entity in the base station device, the network node determines a communication interface with the base station device according to a global identifier of the base station function entity, and sends the data to the base station device by using the communication interface with the base station device so that the data is forwarded by the base station device to the base station function entity.

Embodiment 4

Figure 5:
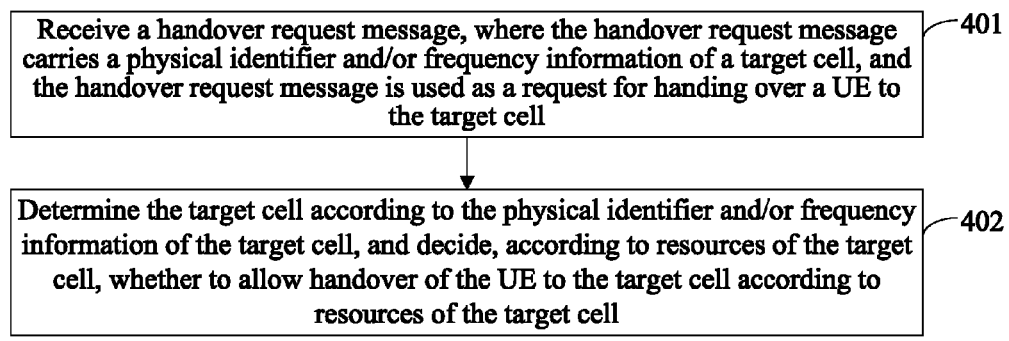
FIG. 5 is a flowchart of a method for implementing multi-cell service on a base station device according to Embodiment 4 of the present invention.

As shown in FIG. 5, the embodiment of the present invention provides a method for implementing multi-cell service on a base station device, where a home base station provides service of at least two cells, and a cell corresponds to a physical identifier and/or a piece of frequency information, the method including the following steps.

Step 401: Receive a handover request message, where the handover request message carries a physical identifier and/or frequency information of a target cell, and the handover request message is used as a request for handing over a UE to the target cell.

Step 402: Determine the target cell according to the physical identifier and/or frequency information of the target cell, and decide, according to resources of the target cell, whether to allow handover of the UE to the target cell.

In the embodiment of the present invention, a home base station provides service of at least two cells, and therefore, a home base station can provide multi-cell service. The home base station determines a target cell according to a physical identifier and/or frequency information of the target cell, and decides, according to resources of the target cell, whether to allow handover of a UE. In this way, the home base station can provide multi-cell service.

Embodiment 5

The embodiment of the present invention provides a method for implementing multi-cell service on a base station device.

In this embodiment, a HeNB provides service of at least two cells so that an HeNB can provide multi-cell service. In addition, a global identifier of each cell is the same as a global identifier of the HeNB, a cell has a corresponding physical identifier and corresponding frequency information, and the physical identifier and the frequency information vary between different cells.

Multiple cells are set in a HeNB so that an HeNB can provide multi-cell service. In addition, each HeNB needs to ensure handover of a UE under the HeNB to a target cell of a target HeNB, so that the HeNB can provide multi-cell service.

Figure 6:
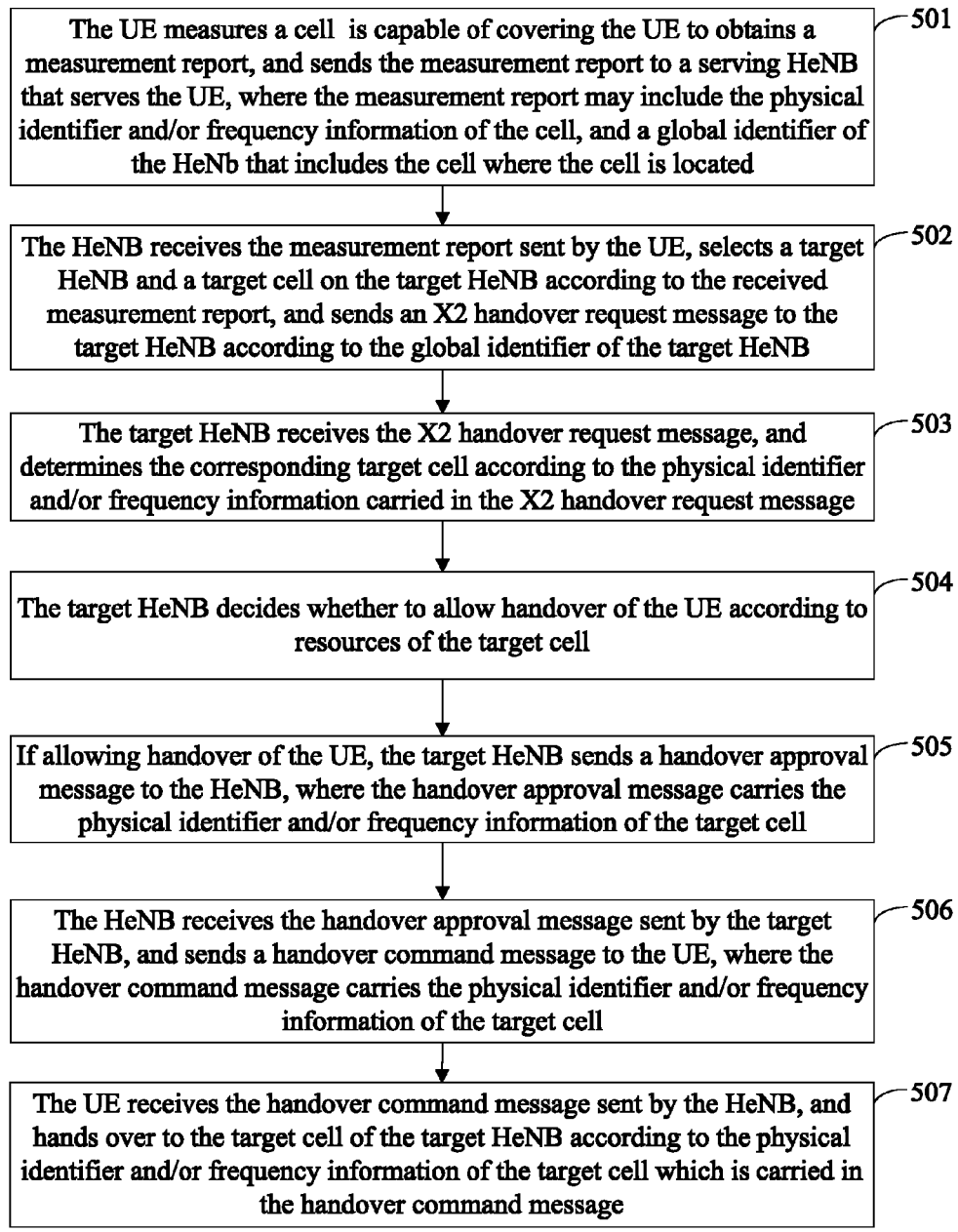
FIG. 6 is a flowchart of a method for implementing multi-cell service on a base station device according to Embodiment 5 of the present invention.

Referring to FIG. 6, in this embodiment, according to the following steps 501 to 506, the HeNB can hand over a UE under the HeNB to a target cell of a target HeNB, including.

Step 501: The UE measures a cell that is capable of covering the UE to obtain a measurement report, and sends the measurement report to a serving HeNB that serves the UE, where the measurement report may include the physical identifier and/or frequency information of the cell, and a global identifier of the HeNB where the cell is located.

The physical identifier may be a PCI (Physical Cell Identity, physical cell identity).

Step 502: The HeNB receives the measurement report sent by the UE, selects a target HeNB and a target cell on the target HeNB according to the received measurement report, and sends an X2 handover request message to the target HeNB according to the global identifier of the target HeNB, where the X2 handover request message carries the physical identifier and/or frequency information of the target cell.

Step 503: The target HeNB receives the X2 handover request message, and determines the corresponding target cell according to the physical identifier and/or frequency information carried in the X2 handover request message.

Step 504: The target HeNB decides whether to allow handover of the UE according to resources of the target cell.

The target HeNB may decide, according to the resources such as air interface resources and/or load processing capabilities of the target cell, whether to allow handover of the UE.

Step 505: If allowing handover of the UE, the target HeNB sends a handover approval message to the HeNB, where the handover approval message carries the physical identifier and/or frequency information of the target cell.

If not allowing handover of the UE, the target HeNB may terminate the handover operation, or the target HeNB may select another cell as a target cell of the UE handover.

Step 506: The HeNB receives the handover approval message sent by the target HeNB, and sends a handover command message to the UE, where the handover command message carries the physical identifier and/or frequency information of the target cell.

Step 507: The UE receives the handover command message sent by the HeNB, and is handed over to the target cell of the target HeNB according to the physical identifier and/or frequency information of the target cell, which is carried in the handover command message.

In the embodiment of the present invention, a HeNB includes multiple cells so that an HeNB can provide multi-cell service. When a UE that needs to hand over to a target cell of a target HeNB exists in the HeNB, the target HeNB determines a target cell according to a physical identifier and/or frequency information of the target cell, and decides, according to resources of the target cell, whether to allow handover of the UE. If the handover is allowed, the UE is handed over to the target cell of the target HeNB according to the physical identifier and/or frequency information of the target cell. In this way, the HeNB can provide multi-cell service.

Embodiment 6

The embodiment of the present invention provides a method for implementing multi-cell service on a base station device.

In this embodiment, a HeNB provides service of at least two cells so that the HeNB can provide multi-cell service. In addition, a global identifier of each cell is the same as a global identifier of the HeNB, a cell has a corresponding physical identifier and corresponding frequency information, and the physical identifier and the frequency information vary between different cells.

Multiple cells are set in a HeNB so that the HeNB can provide multi-cell service. In addition, each HeNB needs to ensure handover of a UE under the HeNB to a target cell of a target HeNB, so that the HeNB can provide multi-cell service.

Figure 7:
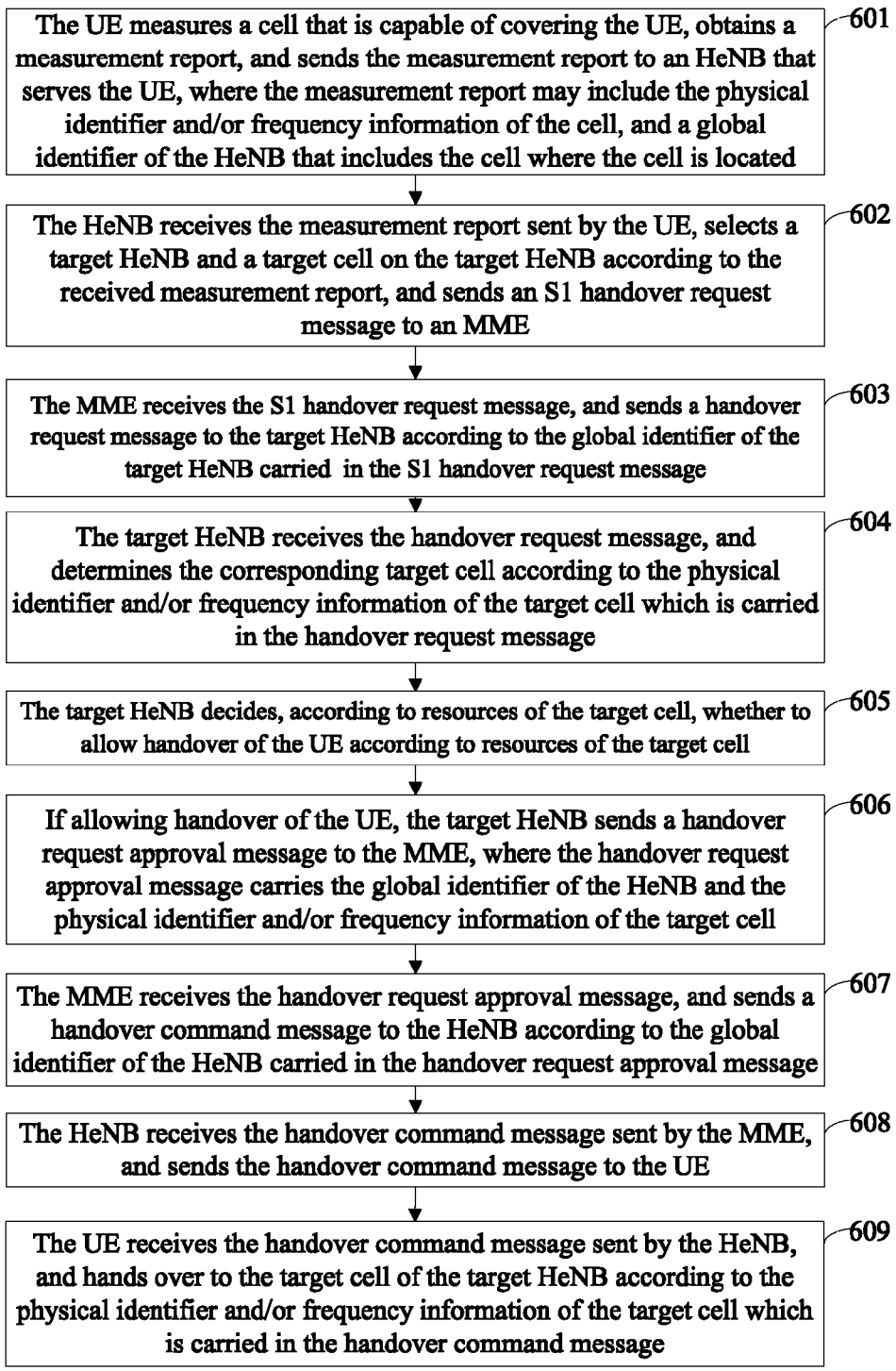
FIG. 7 is a flowchart of a method for implementing multi-cell service on a base station device according to Embodiment 6 of the present invention.

Referring to FIG. 7, in this embodiment, according to the following steps 601 to 609, the HeNB can hand over a UE under the HeNB to a target cell of a target HeNB, including:

Step 601: The UE measures a cell that is capable of covering the UE to obtain a measurement report, and sends the measurement report to a HeNB that serves the UE, where the measurement report may include the physical identifier and/or frequency information of the cell, and a global identifier of the HeNB where the cell is located.

Step 602: The HeNB receives the measurement report sent by the UE, selects a target HeNB and a target cell on the target HeNB according to the received measurement report, and sends an S1 handover request message to an MME, where the S1 handover request message carries the global identifier of the target HeNB and the physical identifier and/or frequency information of the target cell.

Step 603: The MME receives the S1 handover request message, sends a handover request message to the target HeNB according to the global identifier of the HeNB carried in the S1 handover request message, where the handover request message carries the global identifier of the NeNB, and the physical identifier and/or frequency information of the target cell, which is carried in the S1 handover request message.

Step 604: The target HeNB receives the handover request message, and determines the corresponding target cell according to the physical identifier and/or frequency information of the target cell, which is carried in the handover request message.

Step 605: The target HeNB decides, according to resources of the target cell, whether to allow handover of the UE.

The target HeNB may decide, according to the resources such as air interface resources and/or load processing capabilities of the target cell, whether to allow handover of the UE.

Step 606: If allowing handover of the UE, the target HeNB sends a handover request approval message to the MME, where the handover request approval message carries the global identifier of the HeNB, and the physical identifier and/or frequency information of the target cell.

If not allowing handover of the UE, the target HeNB may terminate the handover operation, or the target HeNB may select another cell as a target cell of the UE handover.

Step 607: The MME receives the handover request approval message, and sends a handover command message to the HeNB according to the global identifier of the HeNB carried in the handover request approval message, where the handover command message carries the physical identifier and/or frequency information of the target cell, which is carried in the handover request approval message.

Step 608: The HeNB receives the handover command message sent by the MME, and sends the handover command message to the UE.

Step 609: The UE receives the handover command message sent by the HeNB, and is handed over to the target cell of the target HeNB according to the physical identifier and/or frequency information of the target cell, which is carried in the handover command message.

In the embodiment of the present invention, an HeNB includes multiple cells so that an HeNB can provide multi-cell service. When a UE that needs to hand over to a target cell of a target HeNB exists in the HeNB, the target HeNB determines a target cell according to a physical identifier and/or frequency information of the target cell, and decides, according to resources of the target cell, whether to allow handover of the UE. If the handover is allowed, the UE is handed over to the target cell of the target HeNB according to the physical identifier and/or frequency information of the target cell. In this way, the HeNB can provide multi-cell service.

In the present invention, multiple cells may be set in the HeNB, and the global identifier of each cell is 28 bits. The set global identifier of the HeNB is greater than or equal to 21 bits and less than or equal to 27 bits.

Embodiment 7

Figure 8:
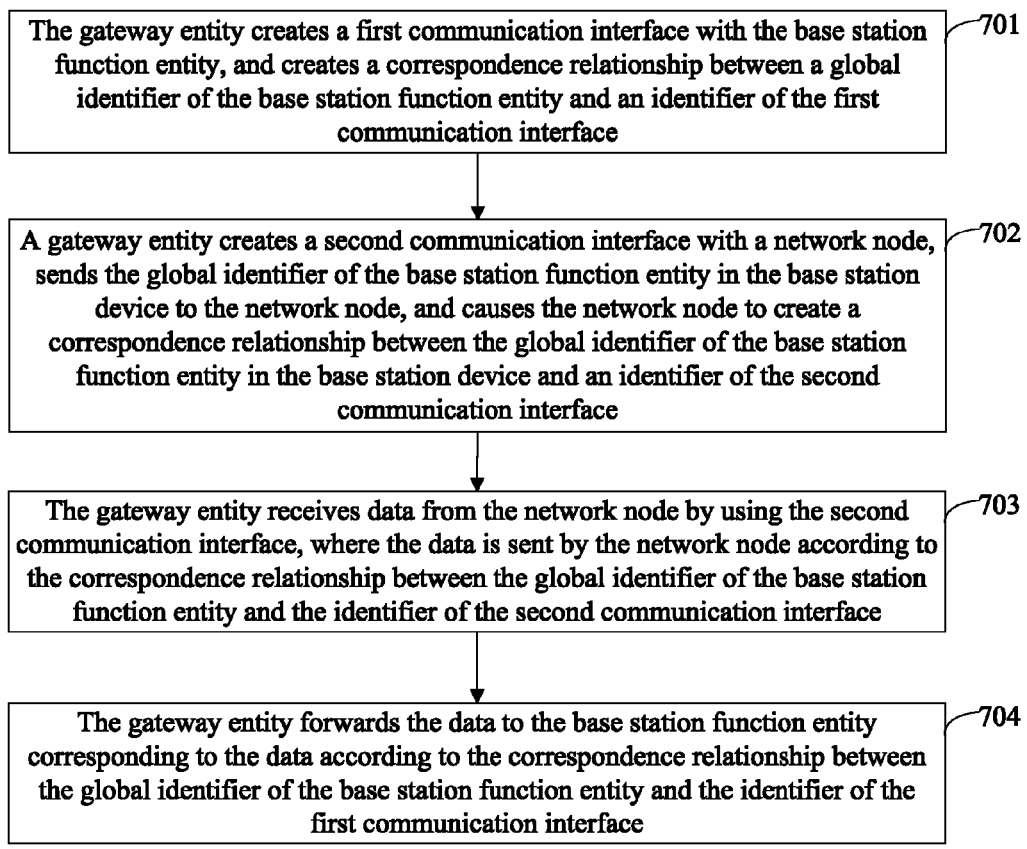
FIG. 8 is a flowchart of a method for implementing multi-cell service on a base station device according to Embodiment 7 of the present invention.

As shown in FIG. 8, the embodiment of the present invention provides a method for implementing multi-cell service on a base station device, where the base station device includes at least two base station function entities and a gateway entity, a base station function entity provides service of one or more cells and the base station function entity corresponds to a global identifier, the method including the following steps.

Step 701: The gateway entity creates a first communication interface with the base station function entity, and creates a mapping relationship between a global identifier of the base station function entity and an identifier of the first communication interface.

Step 702: The gateway entity creates a second communication interface with a network node, sends the global identifier of the base station function entity in the base station device to the network node, and instructs the network node to create a mapping relationship between the global identifier of the base station function entity in the base station device and an identifier of the second communication interface.

Step 703: The gateway entity receives data from the network node by using the second communication interface, where the data is sent by the network node according to the mapping relationship between the global identifier of the base station function entity and the identifier of the second communication interface.

Step 704: The gateway entity forwards the data to the base station function entity corresponding to the data according to the mapping relationship between the global identifier of the base station function entity and the identifier of the first communication interface.

In the embodiment of the present invention, a base station device includes at least two base station function entities and a gateway entity, a base station function entity provides service of one or more cells and a base station function entity corresponds to a global identifier; the gateway entity creates a first communication interface with the base station function entity, and creates a mapping relationship between a global identifier of the base station function entity and an identifier of the first communication interface; the gateway entity creates a second communication interface with a network node, sends the global identifier of the base station function entity in the base station device to the network node, and instructs the network node to create a mapping relationship between the global identifier of the base station function entity in the base station device and an identifier of the second communication interface. In this way, the base station device can provide multi-cell service and meet user requirements.

Embodiment 8

The embodiment of the present invention provides a method for implementing multi-cell service on a base station device.

Figure 9:
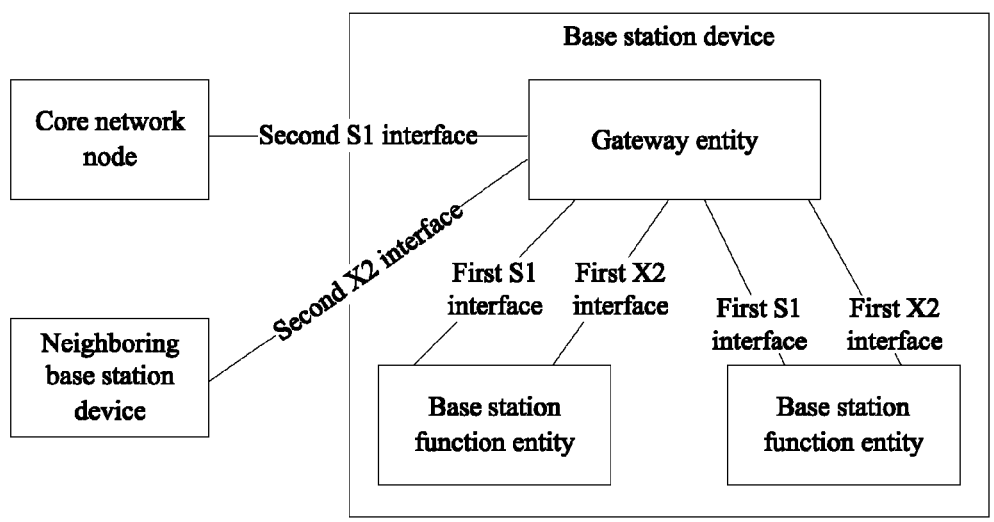
FIG. 9 is a schematic diagram of a network architecture according to Embodiment 8 of the present invention.
Figure 10A:
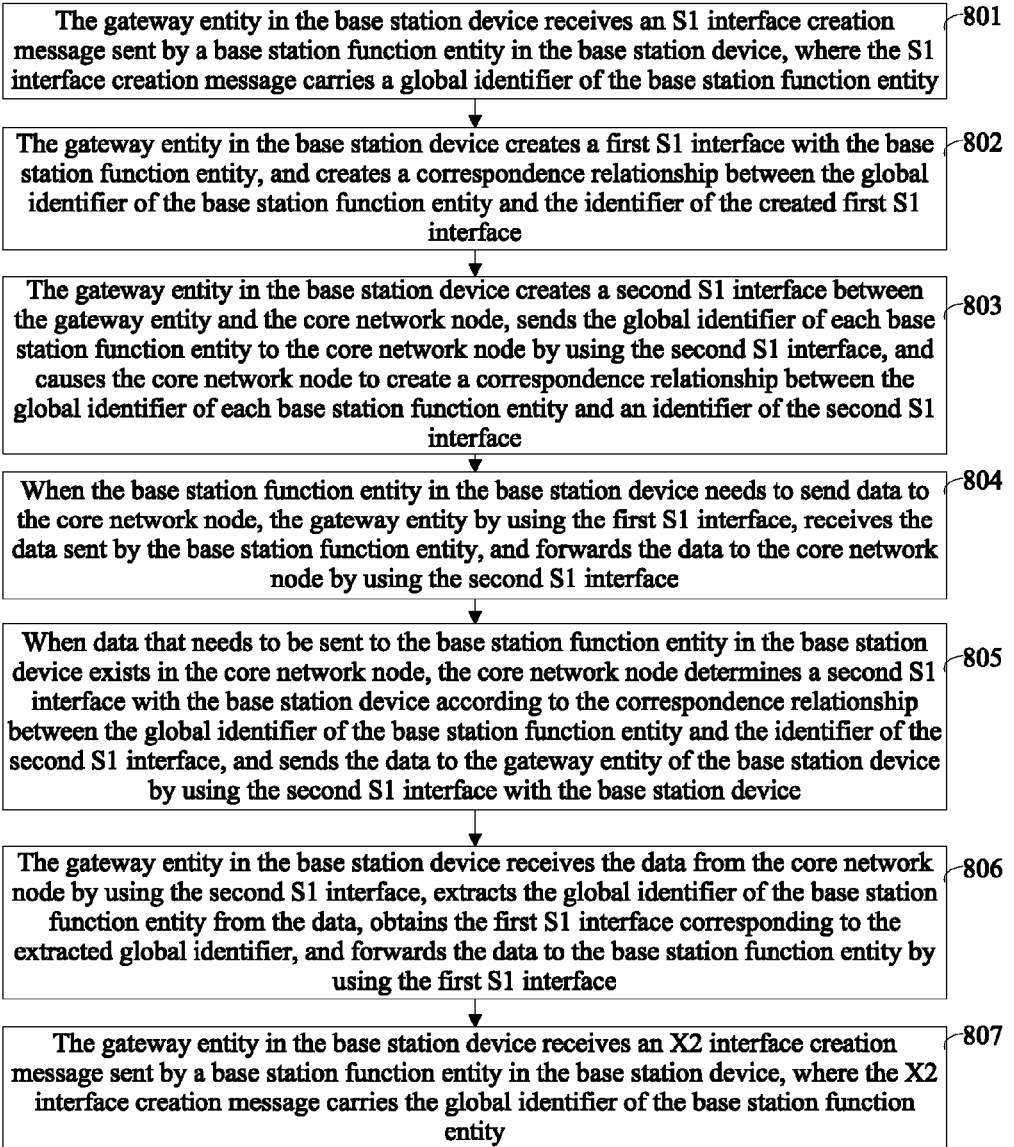
FIG. 10A and FIG. 10B are a flowchart of a method for implementing multi-cell service on a base station device according to Embodiment 8 of the present invention.
Figure 10B:
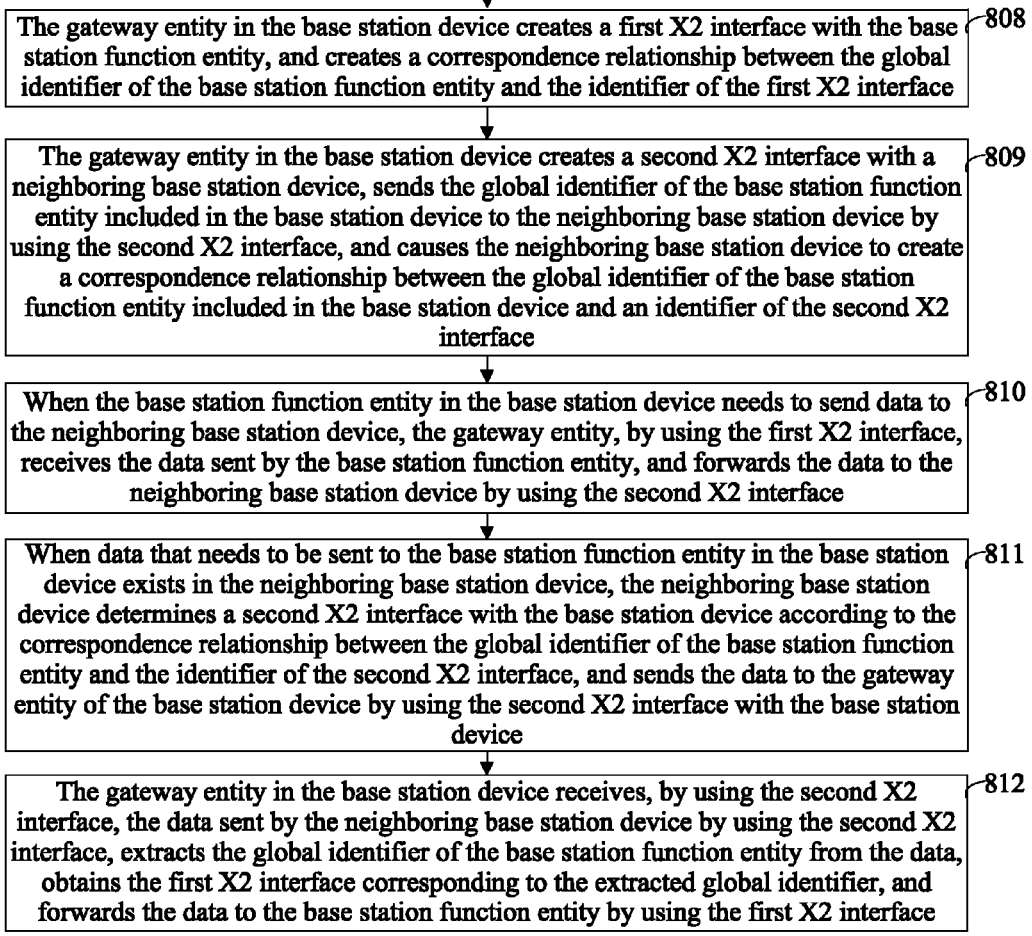

This embodiment is applicable to the network architecture shown in FIG. 9, where a base station device incorporates at least two base station function entities and a gateway entity, a gateway entity corresponds to a region identifier, each base station function entity corresponds to a global identifier, and each base station function entity provides service of one or more cells, so that the base station device can provide multi-cell service. Referring to FIG. 10A and FIG. 10B, the method includes:

Step 801: The gateway entity in the base station device receives an S1 interface creation message sent by a base station function entity in the base station device, where the S1 interface creation message carries a global identifier of the base station function entity.

Each base station function entity in the base station device creates an S1 interface with the gateway entity, and the base station function entity in the base station device sends an S1 interface creation message to the gateway entity, requesting to create an S1 interface with the gateway entity, where the S1 interface creation message carries the global identifier of the base station function entity.

Step 802: The gateway entity in the base station device creates a first S1 interface with the base station function entity, and creates a mapping relationship between the global identifier of the base station function entity and the identifier of the created first S1 interface.

Specifically, the gateway entity in the base station device creates the first S1 interface with the base station function entity, and stores the identifier of the first S1 interface and the global identifier of the base station function entity into the mapping relationship between the identifier of the first S1 interface and the global identifier of the base station function entity.

Each base station function entity in the base station device creates a first S1 interface with the gateway entity in the same way.

Step 803: The gateway entity in the base station device creates a second S1 interface between the gateway entity and the core network node, sends the global identifier of each base station function entity to the core network node by using the second S1 interface, and instructs the core network node to create a mapping relationship between the global identifier of each base station function entity and an identifier of the second S1 interface.

The core network node receives the global identifier of each base station function entity by using the second S1 interface, and stores the identifier of the second S1 interface and the global identifier of each base station function entity into the mapping relationship between the identifier of the second S1 interface and the global identifier of the base station function entity.

Step 804: When the base station function entity in the base station device needs to send data to the core network node, the gateway entity receives, by using the first S1 interface, the data sent by the base station function entity, and forwards the data to the core network node by using the second S1 interface.

Each base station function entity in the base station device sends the data to the gateway entity by using the first S1 interface between the base station function entity and the gateway entity.

Step 805: When data that needs to be sent to the base station function entity in the base station device exists in the core network node, the core network node determines a second S1 interface with the base station device according to the mapping relationship between the global identifier of the base station function entity and the identifier of the second S1 interface, and sends the data to the gateway entity of the base station device by using the second S1 interface with the base station device.

Specifically, the core network node searches for the identifier of the second S1 interface from a stored mapping relationship between the global identifier of the base station function entity and the identifier of the second S1 interface according to the global identifier of the base station function entity included in the data, where the second S1 interface corresponding to the found identifier of the second S1 interface is a second S1 interface with the base station device. The core network node sends the data to the gateway entity of the base station device by using the second S1 interface with the base station device.

Step 806: The gateway entity in the base station device receives, by using the second S1 interface, the data sent by the core network node, extracts the global identifier of the base station function entity from the data, obtains the first S1 interface corresponding to the extracted global identifier, and forwards the data to the base station function entity by using the first S1 interface.

The gateway entity in the base station device obtains the identifier of the first S1 interface from the mapping relationship between the identifier of the first S1 interface and the global identifier of the base station function entity according to the extracted global identifier, obtains the first S1 interface corresponding to the identifier of the first S1 interface, and sends the data to the base station function entity by using the obtained first S1 interface.

Step 807: The gateway entity in the base station device receives an X2 interface creation message sent by a base station function entity in the base station device, where the X2 interface creation message carries the global identifier of the base station function entity.

Each base station function entity in the base station device creates an X2 interface with the gateway entity, and the base station function entity in the base station device sends an X2 interface creation message to the gateway entity, requesting to create an X2 interface with the gateway entity, where the X2 interface creation message carries the global identifier of the base station function entity.

Step 808: The gateway entity in the base station device creates a first X2 interface with the base station function entity, and creates a mapping relationship between the global identifier of the base station function entity and the identifier of the first X2 interface.

Specifically, the gateway entity in the base station device creates the first X2 interface with the base station function entity, and stores the identifier of the first X2 interface and the global identifier of the base station function entity into the mapping relationship between the identifier of the first X2 interface and the global identifier of the base station function entity.

Each base station function entity in the base station device creates a first X2 interface with the gateway entity in the same way.

Step 809: The gateway entity in the base station device creates a second X2 interface with a neighboring base station device, sends the global identifier of the base station function entity included in the base station device to the neighboring base station device by using the second X2 interface, and instructs the neighboring base station device to create a mapping relationship between the global identifier of the base station function entity included in the base station device and an identifier of the second X2 interface.

The neighboring base station device receives the global identifier of each base station function entity included in the base station device by using the second X2 interface, and stores the identifier of the second X2 interface and the global identifier of the base station function entity into the mapping relationship between the identifier of the second X2 interface and the global identifier of the base station function entity.

Step 810: When the base station function entity in the base station device needs to send data to the neighboring base station device, the gateway entity, by using the first X2 interface, receives the data sent by the base station function entity, and forwards the data to the neighboring base station device by using the second X2 interface.

Each base station function entity in the base station device sends the data to the gateway entity by using the first X2 interface between the base station function entity and the gateway entity.

Step 811: When data that needs to be sent to the base station function entity in the base station device exists in the neighboring base station device, the neighboring base station device determines a second X2 interface with the base station device according to the mapping relationship between the global identifier of the base station function entity and the identifier of the second X2 interface, and sends the data to the gateway entity of the base station device by using the second X2 interface with the base station device.

Specifically, the neighboring base station device searches for the identifier of the corresponding second X2 interface from the mapping relationship between the global identifier of the base station function entity and the identifier of the second X2 interface according to the global identifier of the base station function entity included in the data, where the second X2 interface corresponding to the found identifier of the second X2 interface is a second X2 interface with the base station device. The neighboring base station device sends the data to the gateway entity of the base station device by using the second X2 interface with the base station device.

Step 812: The gateway entity in the base station device receives, by using the second X2 interface, the data sent by the neighboring base station device, extracts the global identifier of the base station function entity from the data, obtains the first X2 interface corresponding to the extracted global identifier, and forwards the data to the base station function entity by using the first X2 interface.

The gateway entity in the base station device searches for the identifier of the first X2 interface from the mapping relationship between the identifier of the first X2 interface and the global identifier of the base station function entity according to the extracted global identifier, obtains the first X2 interface corresponding to the identifier of the first X2 interface, and sends the data to the base station function entity by using the obtained first X2 interface.

In the embodiment of the present invention, a base station device includes at least two base station function entities and a gateway entity, a base station function entity provides service of one or more cells and the base station function entity corresponds to a global identifier; the gateway entity creates a first communication interface with the base station function entity, and creates a mapping relationship between a global identifier of the base station function entity and an identifier of the first communication interface; the gateway entity creates a second communication interface with a network node, sends the global identifier of the base station function entity to the network node, and instructs the network node to create a mapping relationship between the global identifier of the base station function entity and an identifier of the second communication interface. In this way, the base station device can provide multi-cell service and meet user requirements.

Embodiment 9

Figure 11:
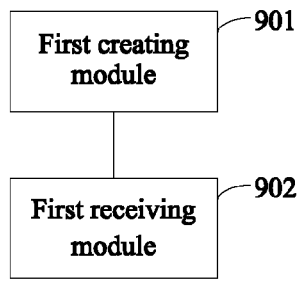
FIG. 11 is a schematic structural diagram of a base station device according to Embodiment 9 of the present invention.

As shown in FIG. 11, the embodiment of the present invention provides a base station device, where the base station device includes at least two base station function entities, a base station function entity provides service of one or more cells and the base station function entity corresponds to a global identifier, the base station device including a first creating module 901 configured to create a communication interface with a network node by using a global identifier of a base station function entity. A first receiving module 902 is configured to receive data from the network node by using the communication interface created by the first creating module 901. The data is sent by the network node according to the global identifier of the base station function entity, and is forwarded to the base station function entity corresponding to the data.

The first creating module 901 is specifically configured to create the communication interface with the network node, and instruct the network node to create a mapping relationship between the global identifier of the base station function entity in the base station device and an identifier of the communication interface.

The first creating module 901 includes a first sending unit configured to send a communication interface creation message to the network node. The communication interface creation message carries a global identifier of a first base station function entity, instruct the network node to create a communication interface with the base station device, and instruct the network node to create a mapping relationship between the global identifier of the first base station function entity and the global identifier of the communication interface. The first base station function entity is a base station function entity, which is the first, in the base station device, that needs to create a communication interface with the network node. A second sending unit is configured to send a base station configuration update message to the network node by using the communication interface. The base station configuration update message carries a first global identifier list, and the first global identifier list includes global identifiers of another base station function entity than the first base station function entity in the base station device. The second sending unit is further configured to instruct the network node to create mapping relationships between the global identifiers of another base station function entity than the first base station function entity in the base station device and the identifier of the communication interface.

The first creating module 901 is specifically configured to send a communication interface creation message to the network node. The communication interface creation message carries a second global identifier list, and the second global identifier list includes the global identifier of the base station function entity included in the base station device. The first creating module 901 is further configured to instruct the network node to create a communication interface with the base station device, and instruct the network node to create the mapping relationship between the global identifier of the base station function entity in the base station device and the identifier of the communication interface.

The base station device further includes a second receiving module configured to, after the network node creates the mapping relationship between the global identifier of the base station function entity in the base station device and the identifier of the communication interface, receive, by using the communication interface created by the first creating module 901, from the network node a global identifier of the base station function entity that has created the mapping relationship with the identifier of the communication interface.

The base station device further includes a determining module configured to, when the base station function entity needs to send data to the network node, determine whether the global identifier of the base station function entity exists in the global identifier of the base station function entity that has created the mapping relationship with the identifier of the communication interface created by the first creating module 901. If the global identifier of the base station function entity exists in the global identifier of the base station function entity that has created the mapping relationship with the identifier of the communication interface created by the first creating module 901, then the data is sent to the network node by using the communication interface.

The first receiving module 902 is specifically configured to receive data from the network node by using the communication interface. The data is sent by the network node according to the global identifier of the base station function entity. The first receiving module 902 is further configured to extract the global identifier of the base station function entity from the data, and forward the data to the corresponding base station function entity according to the extracted global identifier of the base station function entity.

In the embodiment of the present invention, a base station device includes at least two base station function entities, and each base station function entity provides service of one or more cells, so that the base station device can provide multi-cell service. The base station device creates a communication interface with a network node and the network node creates a mapping relationship between a global identifier of the base station function entity in the base station device and an identifier of the communication interface. By using the communication interface, the base station device receives data that is sent by the network node to the base station function entity, and forwards the data to the base station function entity. In this way, the base station device supports multi-cell service and meets user requirements.

Embodiment 10

Figure 12:
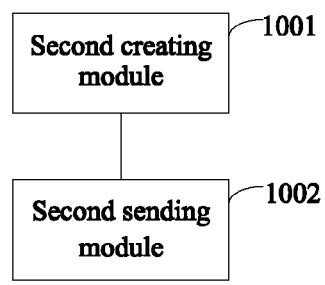
FIG. 12 is a schematic structural diagram of a network node according to Embodiment 10 of the present invention.

As shown in FIG. 12, the embodiment of the present invention provides a network node, including a second creating module 1001 configured to create a communication interface with a base station device by using a global identifier of a base station function entity included in the base station device. The base station device includes at least two base station function entities, a base station function entity provides service of one or more cells and the base station function entity corresponds to a global identifier. A second sending module 1002 is configured to, when data needs to be sent to the base station function entity in the base station device, determine, according to a global identifier of the base station function entity, the communication interface with the base station device that is created by the second creating module 1001. The second sending module 1002 is further configured to send the data to the base station device by using the communication interface with the base station device so that the data is forwarded by the base station device to the base station function entity.

The second creating module is specifically configured to create the communication interface with the base station device, and create a mapping relationship between the global identifier of the base station function entity in the base station device and an identifier of the communication interface.

The second creating module 1001 includes a first receiving unit configured to receive a communication interface creation message sent by the base station device. The communication interface creation message carries a global identifier of a first base station function entity in the base station device. A second creating unit is configured to, according to the communication interface creation message received by the first receiving unit, create a communication interface with the base station device, and create a mapping relationship between the identifier of the communication interface and the global identifier of the first base station function entity. A second receiving unit is configured to receive a base station configuration update message sent by the base station device. The base station configuration update message carries a first global identifier list, and the first global identifier list includes global identifiers of another base station function entity than the first base station function entity in the base station device. A third creating unit is configured to, according to the base station configuration update message received by the second receiving unit, select a global identifier of a base station function entity from the first global identifier list, and store a mapping relationship between the selected global identifier of the base station function entity and the identifier of the communication interface.

The second creating module 1001 includes a third receiving unit configured to receive a communication interface creation message sent by the base station device, where the communication interface creation message carries a second global identifier list, and the second global identifier list includes the global identifier of the base station function entity included in the base station device. A fourth creating unit is configured to, according to the communication interface creation message received by the third receiving unit, create a communication interface with the base station device, select a global identifier of a base station function entity from the second global identifier list, and create a mapping relationship between the selected global identifier of the base station function entity and the identifier of the communication interface.

The second sending module 1002 includes a searching unit configured to search for the identifier of the corresponding communication interface from a stored mapping relationship between the global identifier of the base station function entity and the identifier of the communication interface according to the global identifier of the base station function entity included in the data. A fifth sending unit is configured to determine that a communication interface corresponding to the identifier of the communication interface found by the searching unit is the communication interface with the base station device, and send the data to the base station device by using the communication interface with the base station device.

Embodiment 11

Figure 13:
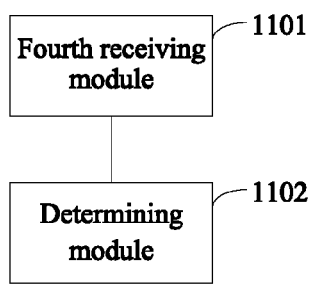
FIG. 13 is a schematic structural diagram of a home base station according to Embodiment 11 of the present invention.

As shown in FIG. 13, the embodiment of the present invention provides a home base station, where the home base station provides service of at least two cells, and a cell corresponds to a physical identifier and/or a piece of frequency information, the home base station includes a fourth receiving module 1101 configured to receive a handover request message. The handover request message carries a physical identifier and/or frequency information of a target cell, and the handover request message is used as a request for handing over a UE to the target cell. A determining module 1102 is configured to determine the target cell according to the physical identifier and/or frequency information of the target cell, and decide, according to resources of the target cell, whether to allow handover of the UE to the target cell.

In the embodiment of the present invention, a home base station includes multiple cells so that a home base station can provide multi-cell service. The home base station determines a target cell according to a physical identifier and/or frequency information of the target cell, and decides, according to resources of the target cell, whether to allow handover of a UE. In this way, the home base station can provide multi-cell service.

Embodiment 12

Figure 14:
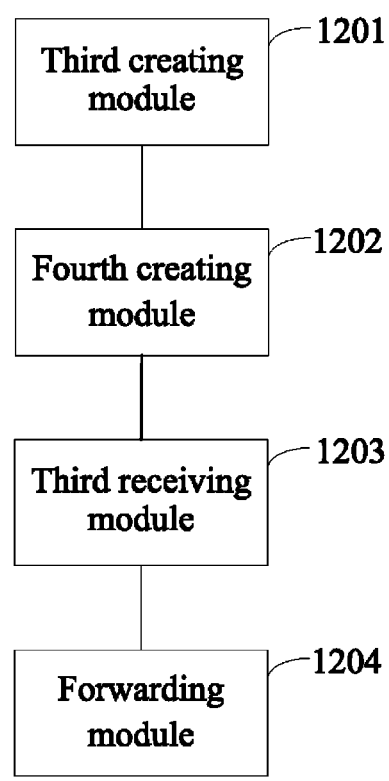
FIG. 14 is a schematic structural diagram of a base station device according to Embodiment 12 of the present invention.

As shown in FIG. 14, the embodiment of the present invention provides a base station device, where the base station device includes at least two base station function entities and a gateway entity, a base station function entity provides service of one or more cells and the base station function entity corresponds to a global identifier. The gateway entity includes a third creating module 1201 configured to create a first communication interface with the base station function entity, and create a mapping relationship between a global identifier of the base station function entity and an identifier of the first communication interface. A fourth creating module 1202 is configured to create a second communication interface with a network node, send the global identifier of the base station function entity in the base station device to the network node, and instruct the network node to create a mapping relationship between the global identifier of the base station function entity in the base station device and an identifier of the second communication interface. A third receiving module 1203 is configured to receive data from the network node by using the second communication interface created by the fourth creating module 1202. The data is sent by the network node according to the mapping relationship between the global identifier of the base station function entity and the identifier of the second communication interface. A forwarding module 1204 is configured to forward the data to the base station function entity corresponding to the data according to the mapping relationship between the global identifier of the base station function entity and the identifier of the first communication interface created by the third creating module 1201.

The third creating module 1201 includes a fourth receiving unit configured to receive a communication interface creation message sent by the base station function entity. The communication interface creation message carries a global identifier of the base station function entity. A creating unit is configured to, according to the communication interface creation message received by the fourth receiving unit, create a first communication interface with the base station function entity, and create a mapping relationship between the identifier of the first communication interface and the global identifier of the base station function entity.

The forwarding module 1204 includes a searching unit configured to search for the identifier of the first communication interface from the mapping relationship between the global identifier of the base station function entity and the identifier of the first communication interface according to the global identifier of the base station function entity included in the data. A forwarding unit is configured to send the data to the base station function entity corresponding to the data by using the first communication interface corresponding to the identifier of the first communication interface that is found by the searching unit.

In the embodiment of the present invention, a base station device includes multiple base station function entities and a gateway entity, a base station function entity provides service of one or more cells and the base station function entity corresponds to a global identifier. The gateway entity creates a first communication interface with the base station function entity, and creates a mapping relationship between a global identifier of the base station function entity and an identifier of the first communication interface. The gateway entity creates a second communication interface with a network node, sends the global identifier of the base station function entity to the network node, and instructs the network node to create a mapping relationship between the global identifier of the base station function entity and an identifier of the second communication interface. In this way, the base station device can provide multi-cell service and meet user requirements.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A method for implementing multi-cell services on a base station device in a wireless network, wherein the base station device comprises at least two base station function entities, each base station function entity providing services to one or more cells so that capacity of the base station device for serving multiple cells is increased, each cell having a cell identifier, and each of the base station function entity is uniquely identified by a global identifier throughout the wireless network, the cell identifier being different than the global identifier, the method comprising:
   creating, by the base station device, a single communication interface for the at least two base station function entities to communicate with a network node by using global identifiers of the at least two base station function entities,
   wherein each of the at least two base station function entities communicates with the network node over the single communication interface without passing through other base station function entities in the at least two base station function entities,
   wherein each of the at least two base station function entities is configured to receive data from the network node, and
   wherein the global identifiers of the at least two base station function entities are mapped to an identifier of the single communication interface so that the single communication interface is identified according to a global identifier of each of the at least two base station function entities for transmitting communications to or from a corresponding base station function entity, and communications transmitted over the communication interface from the network node are able to be forwarded to each of the at least two base station function entities according to a global identifier of a corresponding base station function entity;
   receiving, by the base station device, data sent from the network node by using the single communication interface, wherein the data is sent by the network node according to a first global identifier of one of the at least two base station function entities;
   and forwarding, by the base station device, the data to a base station function entity identified by the first global identifier.

2. The method according to claim 1, wherein the creating, by the base station device, the single communication interface comprises:
   creating, by the base station device, the single communication interface with the network node, and instructing the network node to create a mapping relationship between a global identifier of a base station function entity in the at least two base station function entities and the identifier of the single communication interface.

3. The method according to claim 2, wherein the creating, by the base station device, the single communication interface, and the instructing the network node to create the mapping relationship between the global identifier of the base station function entity and the identifier of the single communication interface, comprise:
   sending, by the base station device, a communication interface creation message to the network node, wherein the communication interface creation message carries a global identifier of a first base station function entity, instructing the network node to create the single communication interface with the base station device, and instructing the network node to create the mapping relationship between the global identifier of the first base station function entity and the global identifier of the single communication interface, wherein the first base station function entity is a base station function entity, which is the first, in the base station device, that needs to create the single communication interface with the network node; and
   sending, by the base station device, a base station configuration update message to the network node by using the single communication interface, wherein the base station configuration update message carries a first global identifier list, and the first global identifier list comprises a global identifier of another base station function entity than the first base station function entity in the base station device, and instructing the network node to create a mapping relationship between the global identifier of another base station function entity than the first base station function entity in the base station device and the identifier of the single communication interface.

4. The method according to claim 2, wherein the creating, by the base station device, the single communication interface, and the instructing the network node to create the mapping relationship between the global identifier of the base station function entity and the identifier of the single communication interface, comprise:
   sending, by the base station device, the communication interface creation message to the network node, wherein the communication interface creation message carries a second global identifier list, and the second global identifier list comprises a global identifier of a base station function entity comprised in the base station device, instructing the network node to create a single communication interface with the base station device, and instructing the network node to create the mapping relationship between the global identifier of the base station function entity in the base station device and the identifier of the single communication interface.

5. The method according to claim 2, wherein the method further comprises:
   after the network node creates the mapping relationship between the global identifier of the base station function entity and the identifier of the single communication interface, receiving, by the base station device, the global identifier of the base station function entity sent from the network node.

6. The method according to claim 5, wherein, after the receiving a global identifier of the base station function entity, the method further comprises:
   when the base station function entity needs to send data to the network node, determining, by the base station device, whether the global identifier of the base station function entity the mapping relationship that is created with the identifier of the single communication interface; and if the global identifier of the base station function entity is determined to have the mapping relationship created, sending the data to the network node by using the single communication interface.

7. The method according to claim 1, wherein the forwarding the data to the base station function entity comprises:

extracting the global identifier of the base station function entity from the data, and forwarding the data to the corresponding base station function entity according to the extracted global identifier of the base station function entity.

8. A base station device in a wireless network, wherein the base station device comprises at least two base station function entities, each base station function entity providing services to one or more cells so that capacity of the base station device for serving multiple cells is increased, each cell having a cell identifier, and each of the base station function entity is uniquely identified by a global identifier throughout the wireless network, the cell identifier being different than the global identifier, the base station device comprising: a processor;

a computer-readable storage medium storing a program to be executed by the processor, the program including instructions for:

creating a single communication interface for the at least two base station function entities to communicate with a network node by using the global identifiers of the at least two base station function entities, wherein each of the at least two base station function entities communicates with the network node over the single communication interface without passing through other base station function entities in the at least two base station function entities, wherein each base station function entity is configured to receive data from the network node, and wherein the global identifiers of the at least two base station function entities are mapped to an identifier of the single communication interface so that the single communication interface is identified according to a global identifier of each of the at least two base station function entities for transmitting communications to or from a corresponding base station function entity, and communications transmitted over the single communication interface from the network node are able to be forwarded to each of the at least two base station function entities according to a global identifier of a corresponding base station function entity; and a receiver, configured to receive data from the network node by using the single communication interface, wherein the data is sent by the network node according to a first global identifier of one of the at least two base station function entity entities, and forward the data to a base station function entity identified by the first global identifier.

9. The base station device according to claim 8, wherein: the program further includes instructions for instructing the network node to create a mapping relationship between a global identifier of a base station function entity in the base station device and the identifier of the single communication interface.

10. The base station device according to claim 9, further comprising: a transmitter, configured to:

send a communication interface creation message to the network node, wherein the communication interface creation message carries a global identifier of a first base station function entity, instruct the network node to create the single communication interface with the base station device, and instruct the network node to create the mapping relationship between the global identifier of the first base station function entity and the global identifier of the single communication interface, wherein the first base station function entity is a base station function entity, which is the first, in the base station device, that needs to create a communication interface with the network node; and send a base station configuration update message to the network node by using the communication interface, wherein the base station configuration update message carries a first global identifier list, and the first global identifier list comprises global identifiers of other base station function entities than the first base station function entity in the base station device, and instruct the network node to create mapping relationships between the global identifiers of the other base station function entities and the identifier of the single communication interface.

11. The base station device according to claim 9, wherein: the program further includes instructions for sending a communication interface creation message to the network node, wherein the single communication interface creation message carries a second global identifier list, and the second global identifier list comprises global identifiers of base station function entities comprised in the base station device, instruct the network node to create a communication interface with the base station device, and instruct the network node to create mapping relationships between the global identifiers of the base station function entities in the base station device and the identifier of the single communication interface.

12. The base station device according to claim 9, wherein the receiver is further configured to, after the network node creates the mapping relationship between the global identifier of the base station function entity in the base station device and the identifier of the single communication interface, receive, by using the single communication interface, from the network node the global identifier of the base station function for which the mapping relationship with the identifier of the single communication interface has been created.

13. The base station device according to claim 12, wherein the program further includes instructions for:

determining whether a global identifier of a base station function entity has a mapping relationship with the identifier of the single communication interface that has been created when the base station function entity needs to send data to the network node; and if the global identifier of the base station function entity is determined to have the mapping relationship created, send the data to the network node by using the single communication interface.

14. The base station device according to claim 8, wherein the receiver is further configured to:

receive data from the network node by using the single communication interface, wherein the data is sent by the network node according to a global identifier of a base station function entity;

extract the global identifier of the base station function entity from the data; and forward the data to the corresponding base station function entity according to the extracted global identifier of the base station function entity.

15. A base station device in a wireless network, wherein the base station device comprises at least two base station function entities, each base station function entity providing services to one or more cells so that capacity of the base station device for serving multiple cells is increased, each cell having a cell identifier, and each of the base station function entity having a global identifier that uniquely identifies a corresponding base station function entity throughout the wireless network, the cell identifier being different than the global identifier, the base station device comprising:

a processor;

a computer-readable storage medium storing a program to be executed by the processor, the program including instructions for:

creating a single communication interface for the at least two base station function entities to communicate with a network node using global identifiers of the at least two base station function entities, wherein each of the at least two base station function entities communicates with the network node over the single communication interface without passing through other base station function entities in the at least two base station function entities, and wherein each of the at least two base station function entity is configured to receive data from the network node;

instructing the network node to create a mapping relationship between a global identifier of each of the at least two base station function entities in the base station device and an identifier of the single communication interface so that the single communication interface is identified according to a global identifier of each of the at least two base station function entities for transmitting communications to or from a corresponding base station function entity, and communications transmitted over the single communication interface from the network node are able to be forwarded to each of the at least two base station function entities according to a global identifier of a corresponding base station function entity; and a receiver, configured to receive data from the network node using the single communication interface, wherein the data is sent by the network node according to a first global identifier of a base station function entity in the at least two base station function entities, and forward the data to the base station function entity identified by the first global identifier of the base station function entity.

* * * * *

UNITED STATES PATENT AND TRADEMARK OFFICE
CERTIFICATE OF CORRECTION

PATENT NO. : 9,668,257 B2
APPLICATION NO. : 14/448449
DATED : May 30, 2017
INVENTOR(S) : Bo Lin

Page 1 of 1

It is certified that error appears in the above-identified patent and that said Letters Patent is hereby corrected as shown below:

In the Claims

In Column 27, Line 1, Claim 6, delete "entity the" and insert --entity has the--.

In Column 27, Line 55, Claim 8, delete "entity".

In Column 28, Line 43, Claim 12, delete "function for" and insert --function entity for--.

Signed and Sealed this
Thirty-first Day of July, 2018

Andrei Iancu
*Director of the United States Patent and Trademark Office*